United States Patent
Hwang et al.

(10) Patent No.: US 12,519,097 B2
(45) Date of Patent: Jan. 6, 2026

(54) NEGATIVE ELECTRODE PRE-LITHIATION METHOD

(71) Applicant: LG ENERGY SOLUTION, LTD., Seoul (KR)

(72) Inventors: Seung Hae Hwang, Daejeon (KR); Ye Ri Kim, Daejeon (KR); Su Yeon Lee, Daejeon (KR); Oh Byong Chae, Daejeon (KR); Seo Young Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 782 days.

(21) Appl. No.: 17/772,428

(22) PCT Filed: Aug. 26, 2021

(86) PCT No.: PCT/KR2021/011473
§ 371 (c)(1),
(2) Date: Apr. 27, 2022

(87) PCT Pub. No.: WO2022/045809
PCT Pub. Date: Mar. 3, 2022

(65) Prior Publication Data
US 2022/0393145 A1  Dec. 8, 2022

(30) Foreign Application Priority Data
Aug. 28, 2020 (KR) .................. 10-2020-0109040

(51) Int. Cl.
*H01M 4/04* (2006.01)
*H01M 4/02* (2006.01)
(Continued)

(52) U.S. Cl.
CPC ....... *H01M 4/0445* (2013.01); *H01M 4/0459* (2013.01); *H01M 10/0525* (2013.01);
(Continued)

(58) Field of Classification Search
CPC ............ H01M 4/0445; H01M 4/0459; H01M 10/0525; H01M 10/0562; H01M 2004/027; H01M 2300/008
See application file for complete search history.

(56) References Cited

U.S. PATENT DOCUMENTS 11,050,055 B2   6/2021  Bräunling et al.
2014/0313639 A1* 10/2014  Raman ................... H01G 11/06
                                              205/766
(Continued)

FOREIGN PATENT DOCUMENTS

CN    105470465 A    4/2016
CN    105980732 A    9/2016
(Continued)

OTHER PUBLICATIONS

International Search Report for PCT/KR2021/011473 mailed on Dec. 6, 2021.
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP

(57) ABSTRACT

A negative electrode pre-lithiation method comprising the steps of: manufacturing a negative electrode by forming, on a negative electrode current collector, a negative electrode active material layer comprising a negative electrode active material. Then, manufacturing a pre-lithiation cell, which comprises the negative electrode and a lithium metal counter electrode, and impregnating the pre-lithiation cell with a pre-lithiation solution; and charging the pre-lithiation cell with a constant voltage to form a pre-lithiated negative
(Continued)

electrode. The pre-lithiation solution comprises 3 vol % to 30 vol % of an organic carbonate compound substituted with halogen.

15 Claims, 1 Drawing Sheet

(51) Int. Cl.
*H01M 10/0525* (2010.01)
*H01M 10/0562* (2010.01)

(52) U.S. Cl.
CPC .............. *H01M 10/0562* (2013.01); *H01M 2004/027* (2013.01); *H01M 2300/008* (2013.01)

(56) References Cited

U.S. PATENT DOCUMENTS

| | | | |
|---|---|---|---|
| 2016/0118653 A1* | 4/2016 | Brener | H01M 4/049 205/639 |
| 2017/0162859 A1* | 6/2017 | Yang | H01M 4/38 |
| 2019/0044130 A1* | 2/2019 | Ogata | H01M 4/366 |
| 2019/0252684 A1* | 8/2019 | Yang | H01M 10/0525 |
| 2021/0066703 A1 | 3/2021 | Kim et al. | |
| 2021/0111389 A1 | 4/2021 | Doi et al. | |
| 2021/0159500 A1 | 5/2021 | Chae et al. | |
| 2021/0384485 A1 | 12/2021 | Chae et al. | |
| 2022/0020976 A1 | 1/2022 | Chae et al. | |

FOREIGN PATENT DOCUMENTS

| | | |
|---|---|---|
| CN | 109004182 A | 12/2018 |
| CN | 111433948 A | 7/2020 |
| CN | 113614951 A | 11/2021 |
| JP | 2010-160982 A | 7/2010 |
| JP | 2010-186689 A | 8/2010 |
| JP | 2019-145385 A | 8/2019 |
| JP | 2014-17209 A | 11/2025 |
| JP | 2020-27737 A | 11/2025 |
| KR | 10-2014-0106355 A | 9/2014 |
| KR | 10-1594784 B1 | 2/2016 |
| KR | 10-2019-0030345 A | 3/2019 |
| KR | 10-2019-0042336 A | 4/2019 |
| KR | 10-2019-0042733 A | 4/2019 |
| KR | 10-2019-0083304 A | 7/2019 |
| KR | 10-2020-0030482 A | 3/2020 |
| KR | 10-2020-0046944 A | 5/2020 |
| KR | 10-2020-0092643 A | 8/2020 |
| KR | 10-2020-0095039 A | 8/2020 |
| WO | WO 2015/126649 A1 | 8/2015 |
| WO | WO 2018/088311 A1 | 5/2018 |
| WO | WO 2019/088139 A1 | 5/2019 |
| WO | WO 2019/194100 A1 | 10/2019 |
| WO | WO 2020/055183 A1 | 3/2020 |
| WO | WO 2020/096177 A1 | 5/2020 |
| WO | WO 2020/124328 A1 | 6/2020 |
| WO | WO 2020/085823 A1 | 11/2025 |

OTHER PUBLICATIONS

Kim et al., "Controlled Prelithiation of Silicon Monoxide for High Performance Lithium-Ion Rechargeable Full Cells", Nano Letters, 2016, vol. 16, No. 1, pp. A-G.

Extended European Search Report for European Application No. 21862105.0, dated Nov. 7, 2023.

Japanese Office Action dated Apr. 24, 2023 for corresponding Japanese Application No. 2022-523673 with English translation.

* cited by examiner

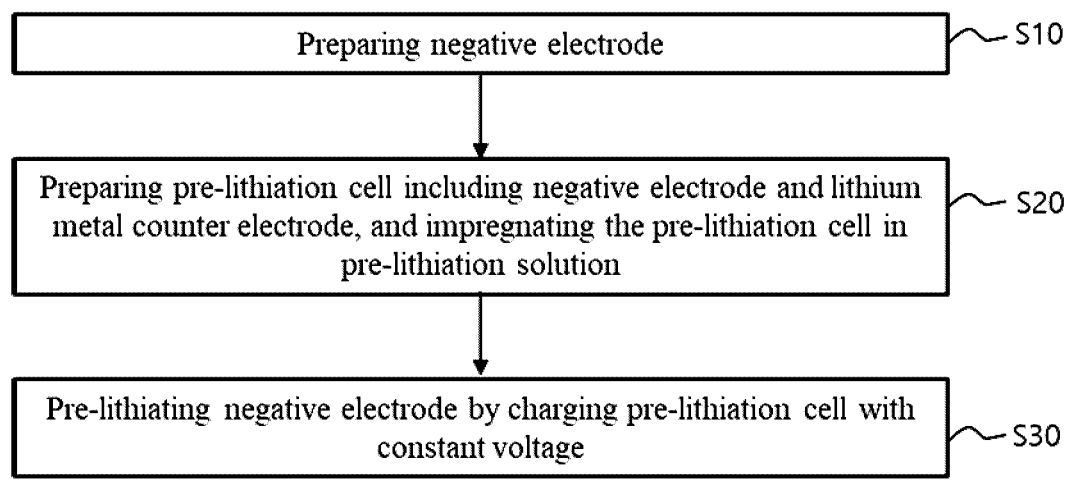

NEGATIVE ELECTRODE PRE-LITHIATION METHOD

TECHNICAL FIELD

This application claims the benefit of priority based on Korean Patent Application No. 10-2020-0109040, filed on Aug. 28, 2020, and the entire contents of the Korean patent application are incorporated herein by reference.

The present invention relates to a method for pre-lithiating a negative electrode. Further, the present invention relates to a negative electrode pre-lithiated by a method of pre-lithiating a negative electrode.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

In the case of such a negative electrode, a passive film such as a solid electrolyte interface (SEI) layer is formed on the surface of the negative electrode during the initial charge. The passive film interrupts injection of the organic solvent into the negative electrode and suppresses decomposition reaction of the organic solvent, thereby stabilizing the structure of the negative electrode, improving the reversibility of the negative electrode, and allowing the negative electrode to be usable. However, since the formation reaction of the passive film is an irreversible reaction, the consumption of the lithium ions is caused, thereby decreasing the capacity of the battery, and as the battery cycle is repeated, the lithium ions are consumed, thereby causing capacity reduction and cycle lifespan reduction.

As such, a method for forming a passive film on the surface of a negative electrode, preventing the capacity reduction and improving cycle lifespan by pre-lithiating the negative electrode through inserting lithium into the negative electrode in advance is currently developed. Such a pre-lithiation method includes a physical method of allowing lithium metal to directly contact the surface of the negative electrode, and a method of connecting lithium metal with the negative electrode and electrochemically charging the negative electrode.

Likewise, since the pre-lithiated negative electrode is in a reduced state, thermodynamically voluntary redox reaction occurs when contacting oxygen or carbon dioxide as an oxidant in the air. In this case, electrons and lithium ions, which have been introduced through pre-lithiation, are consumed. Namely, in the case of an electrode, where some of lithium ions and electrons, which had been introduced in advance through pre-lithiation, were consumed by redox reaction with oxygen or carbon dioxide, the targeted capacity and coulomb efficiency could not be achieved, and the lifespan characteristics of the battery were not improved sufficiently.

Hence, there is a need for a technology for producing an electrode having enhanced oxidation resistance during a pre-lithiation process.

DISCLOSURE

Technical Problem

The present invention is believed to solve at least some of the above problems. For example, an aspect of the present invention provides a method of pre-lithiating a negative electrode capable of preventing reduction of cycle performance and preventing reduction of coulomb efficiency by reaction between the negative electrode and oxygen or carbon dioxide by enhancing the oxidation resistance of the negative electrode during the pre-lithiation process.

Technical Solution

A method of pre-lithiating a negative electrode according to the present invention includes: preparing a negative electrode by forming a negative electrode active material layer including a negative electrode active material on a negative electrode current collector; preparing a pre-lithiation cell including the negative electrode and a lithium metal counter electrode, and impregnating the pre-lithiation cell in a pre-lithiation solution; and pre-lithiating the negative electrode by charging the pre-lithiation cell with a constant voltage to form a pre-lithiated negative electrode, wherein the pre-lithiation solution contains 3 volume % to 30 volume % of an organic carbonate compound substituted with halogen.

In a specific example, the negative electrode active material contains a carbon-based active material and a silicon-based active material.

In a specific example, the organic carbonate compound substituted with halogen is a cyclic carbonate expressed by chemical Formula 1 below.

[Chemical formula 1]

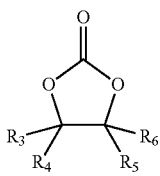

Herein, $R_3$, $R_4$, $R_5$, and $R_6$ are each independently hydrogen, a halogen or a substituted or unsubstituted alkyl group having 1 to 10 carbon atoms, and at least one of $R_3$, $R_4$, $R_5$, and $R_6$ is halogen, or is the alkyl group substituted with halogen.

More specifically, the organic carbonate compound substituted with halogen is a fluoroethylene carbonate.

Further, in a specific example, the pre-lithiation solution contains 5 to 20 volume % of an organic carbonate compound substituted with halogen.

In a specific example, during the pre-lithiating of the negative electrode, the negative electrode is charged with a constant voltage of 0.1 to −1 V (vs. Li/Li+).

Further, the pre-lithiating of the negative electrode is performed by charging the pre-lithiation cell to reach 5 to 30% of a theoretical charge capacity.

Further, the method of pre-lithiating a negative electrode according to the present invention further includes aging the pre-lithiated negative electrode to form an aged negative electrode.

Further, the method of pre-lithiating a negative electrode according to the present invention further includes washing and drying the aged negative electrode.

At this time, an SEI film is formed on a surface of the pre-lithiated negative electrode.

Herein, the SEI film contains LiF and $Li_2CO_3$.

Specifically, an amount of LiF present in the SEI film is in a range of 10 to 20% by weight, and an amount of $Li_2CO_3$ present in the SEI film is in a range of 20 to 40% by weight.

Further, the present invention provides a method for manufacturing a secondary battery including the above-described method of pre-lithiating a negative electrode.

Further, the present invention provides a pre-lithiated negative electrode which is pre-lithiated according to the above-described method of pre-lithiating a negative electrode, wherein a SEI film is on a surface of the negative electrode, and an amount of LiF present in the SEI film is in a range of 10 to 20% by weight, and an amount of $Li_2CO_3$ present in the SEI film is in a range of 20 to 40% by weight.

Advantageous Effects

According to the present invention, an SEI, which does not have an electron transfer capability, can be formed at the time of pre-lithiation by adding an organic carbonate compound substituted with halogen atoms to a pre-lithiation solution. Namely, a negative electrode having enhanced oxidation resistance can be manufactured by forming an inorganic film without an electron transfer capability. Further, the formation of an SEI without an electron transfer capability can be maximized by charging the negative electrode up to a certain capacity with a constant voltage during the pre-lithiation process.

Through this, it is possible to prevent redox reaction with oxygen or carbon dioxide on the surface of the negative electrode, and it is possible to prevent reduction in the initial coulomb efficiency and cycle characteristics of the battery.

BRIEF DESCRIPTION OF THE DRAWINGS

The FIGURE is a flowchart illustrating the sequence of a method of pre-lithiating a negative electrode according to the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described in the specification, and they do not exclude in advance the possibility of the presence or addition of one or more other features, numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

The FIGURE is a flowchart illustrating the sequence of a method of pre-lithiating a negative electrode according to the present invention.

Referring to the FIGURE, a method of pre-lithiating a negative electrode according to the present invention includes: preparing a negative electrode by forming a negative electrode active material layer including a negative electrode active material on a negative electrode current collector (S10); preparing a pre-lithiation cell including the negative electrode and a lithium metal counter electrode, and impregnating the pre-lithiation cell in a pre-lithiation solution (S20); and pre-lithiating the negative electrode by charging the pre-lithiation cell with a constant voltage (S30), wherein the pre-lithiation solution contains 3 to 30 volume % of an organic carbonate compound substituted with halogen atoms.

As described above, since the pre-lithiated negative electrode is in a reduced state, thermodynamically voluntary redox reaction occurs when contacting oxygen or carbon dioxide as an oxidant in the air. As such, electrons and lithium ions, which have been introduced through pre-lithiation, are consumed. In this case, the intended capacity and coulomb efficiency cannot be achieved, and the lifespan characteristics of the battery cannot be improved.

According to the present invention, an SEI, which does not have an electron transfer capability, can be formed at the time of pre-lithiation by adding an organic carbonate compound substituted with halogen atoms to a pre-lithiation solution. Namely, it is possible to manufacture a negative electrode having improved oxidation resistance by forming an inorganic film containing LiF and $Li_2CO_3$ without an electron transfer capability. Further, the formation of an SEI without an electron transfer capability can be maximized by charging the pre-lithiation cell up to a certain capacity with a constant voltage during the pre-lithiation process.

Through this, it is possible to prevent redox reaction with oxygen or carbon dioxide on the surface of the negative electrode, and it is possible to prevent reduction in the initial coulomb efficiency and cycle characteristics of the battery.

Hereinafter, each step of a method of pre-lithiating a negative electrode according to the present invention will be described in detail.

<Preparation of Negative Electrode>

In the method of pre-lithiating a negative electrode according to the present invention, the negative electrode can be manufactured by forming a negative electrode active material layer by applying a negative electrode slurry containing a negative electrode active material on the negative electrode current collector. At this time, the negative electrode slurry may further include conductive materials and binders. At this time, the negative electrode active material layer may be formed on both surfaces of the negative electrode current collector.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The negative electrode active material may contain at least one selected from the group consisting of a carbon-based active material and a silicon-based active material.

The silicon-based active material may impart excellent capacity characteristics to the negative electrode or secondary battery of the present invention and may contain a compound represented by $SiO_x$ ($0 \leq x < 2$). Since $SiO_2$ does not react with lithium ions, lithium cannot be stored, and thus x is preferably in the above range. More preferably, the silicon-based oxide may be SiO. The average particle diameter ($D_{50}$) of the silicon-based oxide may be 1 to 30 μm, and preferably 3 to 15 μm in terms of reducing side reaction with the electrolyte solution while maintaining structural stability during charge/discharge. The average particle diameter $D_{50}$ may be measured using, for example, a laser diffraction method.

The carbon-based active material may impart excellent cycle characteristics or battery lifespan performance to a secondary battery or a negative electrode for a secondary battery of the present invention. Specifically, the carbon-based active material may contain at least one selected from the group consisting of artificial graphite, natural graphite, hard carbon, soft carbon, carbon black, acetylene black, Ketjen black, super P, graphene and textile carbon, and preferably at least one selected from the group consisting of artificial graphite and natural graphite. The average particle diameter ($D_{50}$) of the carbon-based oxide may be 10 to 30 μm, and preferably 15 to 25 μm in terms of reducing side reaction with the electrolyte solution while maintaining structural stability during charge/discharge.

Specifically, both the silicon-based active material and the carbon-based active material may be used as the negative electrode active material in terms of improving both the capacity characteristics and cycle characteristics. Specifically, the negative electrode active material may include the carbon-based active material and the silicon-based active material in the weight ratio of 50:50 to 95:5, and preferably in the weight ratio of 60:40 to 90:10.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The negative electrode may be manufactured by coating a negative electrode slurry, which has been prepared by mixing a negative electrode active material, a binder, a conductive material with a solvent, on a negative electrode current collector. The solvent used for formation of the negative electrode slurry may contain at least one selected from the group consisting of distilled water, ethanol, methanol and isopropyl alcohol and may preferably contain distilled water in terms of making dispersion of components easy.

Further, the thickness of the negative electrode active material layer may be in the range of 10 to 250 μm, preferably 80 to 200 μm.

<Pre-Lithiation>

When a negative electrode is manufactured, the negative electrode is pre-lithiated. Specifically, a pre-lithiation cell, which contains a negative electrode and a lithium metal counter electrode, is prepared, and the pre-lithiation cell is impregnated in a pre-lithiation solution. Thereafter, the pre-lithiation cell is electrochemically charged to pre-lithiate the negative electrode. At this time, a pre-lithiation cell refers to one unit which performs the function of a battery cell as one pair of a negative electrode and a lithium metal counter electrode.

Further, the form of the pre-lithiation cell does not matter as long as it can perform electrochemical charge. For example, it is possible to manufacture a coin cell in a state that a separator is interposed between a negative electrode and a lithium metal, to have the same form as that of an actual battery cell. In this case, the pre-lithiation solution is injected into the manufactured pre-lithiation cell. Further, the negative electrode may be accommodated in a pre-lithiation reactor, where a pre-lithiation solution has been accommodated, in a state spaced apart from lithium metal for preparation. At this time, the negative electrode may have a form in which a negative electrode roll, which was wound in the form of a roll, is accommodated in a pre-lithiation solution, or the negative electrode mounted on a transfer conveyor may be inserted into a pre-lithiation reactor by the movement of the transfer conveyor, to thereby be fixed in a state that is spaced apart from a lithium metal counter electrode.

The pre-lithiation solution may contain a lithium salt and an organic solvent.

Specifically, the lithium salt may contain at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlC$_4$, CH$_3$SO$_3$Li, CF$_3$SO$_3$Li, (CF$_3$SO$_2$)$_2$NLi, (FSO$_2$)$_2$NLi, chloro boran lithium, low aliphatic carboxylic acid lithium, and 4 phenyl boric acid lithium.

Any organic solvent, which is commonly used in the related art, may be used as the organic solvent, but a high boiling point organic solvent may be preferably used to minimize the consumption of the electrolyte solution for pre-lithiation by evaporation during pre-lithiation.

For example, the organic solvent may contain at least one selected from the group consisting of a carbonate-based solvent and an ester-based solvent. The non-aqueous solvent may contain at least one selected from the group consisting of propylene carbonate (PC), ethylene carbonate (EC), diethyl carbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethyl methylcarbonate (EMC), gamma butyrolactone (g-butyrolactone), ethyl propionate, methyl propionate, but the present invention is not limited thereto.

Herein, the pre-lithiation solution may contain a carbonate compound substituted with halogen atoms. The carbonate compound substituted with the halogen atoms can electronically insulate the negative electrode by forming SEI containing a large amount of LiF and Li$_2$CO$_3$ on the surface of the negative electrode at the time of pre-lithiation. Namely, the oxidation resistance of the negative electrode can be enhanced.

Specifically, the organic carbonate compound substituted with the halogen atoms is a cyclic carbonate expressed by chemical Formula 1 below.

[Chemical formula 1]

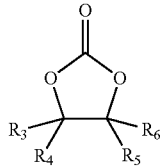

Herein, R$_3$, R$_4$, R$_5$, and R$_6$ are each independently hydrogen, or a substituted or unsubstituted alkyl group of carbon number 1 to 10, and at least one of R$_3$, R$_4$, R$_5$, and R$_6$ is substituted with halogen.

More specifically, the organic carbonate compound substituted with the halogen atoms may be a fluoroethylene carbonate (FEC). In the case of using fluoroethylene carbonate, an SEI film containing LiF can be easily formed on the surface of the negative electrode by reaction with lithium during electrochemical charge for pre-lithiation. A stable SEI film is formed as the organic carbonate compound is consumed earlier than other component in the pre-lithiation solution.

At this time, the pre-lithiation solution may contain 3 to 30 volume % of an organic carbonate compound substituted with halogen atoms, specifically 5 to 20 volume % of the organic carbonate compound, and more specifically 10 to 20 volume % of the organic carbonate compound. When the content of the organic carbonate compound substituted with halogen atoms is in the above range, a LiF and Li$_2$CO$_3$ compound can be stably formed in the SEI film.

Further, the pre-lithiation solution may further contain other additives, and the additives may include one or more of vinylene carbonate, vinylethylene carbonate, salicylic acid, LiBF$_4$, LITFSI (Lithium bis(trifluoromethanesulfonyl) imide), LiBOB (Lithium bis(oxalato)borate), and LiODFB (Lithium difluoro(oxalato)borate).

Further, the temperature of the pre-lithiation solution may be 10 to 80° C., specifically 20 to 60° C., and more specifically 25 to 40° C. When pre-lithiation is performed in the above temperature range, lithium can be smoothly diffused.

The negative electrode may be pre-lithiated by being charged and discharged by a charge and discharge unit after being connected to the lithium metal counter electrode.

The present invention includes a lithium metal counter electrode as a lithium supply source which supplies lithium ions into the negative electrode. The lithium metal counter electrode can function as a counter electrode to the negative electrode when electrochemically charged for pre-lithiation as the lithium metal counter electrode is disposed to be spaced apart by a predetermined distance from at least one negative electrode which is inserted into the pre-lithiation solution. The lithium metal counter electrode may have a sheet form disposed to face the negative electrode.

The thickness of the lithium metal counter electrode may be appropriately set in consideration of the pre-lithiation level, and may specifically be 10 to 500 μm, and more specifically be 40 to 200 μm.

The lithium metal counter electrode can prevent a short circuit phenomenon which may occur by a direct contact between the negative electrode and the lithium metal counter electrode during electrochemical charge by being spaced apart from the negative electrode.

At this time, the separation distance between the lithium metal counter electrode and the negative electrode may be 1 to 20 mm. Specifically, the separation distance between the lithium metal counter electrode and the negative electrode may be 3 to 15 mm, and more specifically 6 to 12 mm. When the separation distance between the lithium metal counter electrode and the negative electrode is in the above range, lithium may be smoothly inserted into the negative electrode at the time of pre-lithiation while sufficiently preventing a short circuit phenomenon which may occur by a direct contact between the negative electrode and the lithium metal counter electrode.

Further, when a negative electrode and a lithium metal are manufactured in the form of one battery cell, a separator may be interposed between the negative electrode and the lithium metal. The separator may prevent a short circuit phenomenon which may occur by a direct contact between the negative electrode and the lithium metal at the time of electrochemical charge of the negative electrode, and may prevent a problem that the lithium inserting speed into the negative electrode is not adjusted when the negative electrode directly contacts the lithium metal.

The separator preferably has a low resistance to the movement of lithium ions and has an excellent electrolyte solution moisturizing capability. Specifically, the separator may contain a porous polymer film including at least one selected from the group consisting of an ethylene polymer, a propylene polymer, an ethylene/butene copolymer, an ethylene/hexene copolymer, an ethylene/methacrylate copolymer, and a polyolefin polymer; a porous nonwoven fabric including at least one selected from the group consisting of a glass fiber and polyethylene terephthalate fiber of a high melting point; or a combination thereof. The separator may include a porous polymer film, and preferably a porous polymer film including a polyolefin-based polymer, in terms of mechanical stability and chemical stability.

The thickness of the separator may be in the range of 3 to 50 μm, and preferably in the range of 8 to 20 μm in terms of smooth insertion/diffusion into the negative electrode and uniform pre-lithiation.

When a pre-lithiation cell is prepared, the pre-lithiation cell may be impregnated in a pre-lithiation solution. As described above, in the case that a pre-lithiation reactor having a pre-lithiation solution accommodated therein is separately prepared, the negative electrode may be left in the pre-lithiation solution for a predetermined time. Further, when the lithium metal counter electrode and the negative electrode are manufactured as one cell, a pre-lithiation solution may be injected into the cell and stored for a predetermined time.

At this time, the impregnation time may be appropriately set according to the pre-lithiation condition. For example, it may be 5 minutes to 12 hours, specifically 10 minutes to 180 minutes, and more specifically 15 minutes to 40 minutes. Through this, as the negative electrode becomes sufficiently set in the pre-lithiation solution, the pre-lithiation may be uniformly performed in the negative electrode. When the impregnation time exceeds the above range, the durability of the negative electrode decreases and the active material may be easily detached from the current collector. When the impregnation time is not within the range, it is difficult for the pre-lithiation solution to be sufficiently permeated into the negative electrode and it may become difficult for the pre-lithiation to be uniformly performed.

When the pre-lithiation cell is impregnated in an electrolyte solution, the pre-lithiation cell is charged with a constant voltage when charge/discharge is performed. It is possible to form an environment where a lot of electrons can be received around the surface of the negative electrode where redox reactions occur by charging the pre-lithiation cell up to a specific capacity with a constant voltage, and through this, a SEI film, which contains a lot of LiF and $Li_2CO_3$ can be formed. Namely, it is possible to maximize formation of a film capable of blocking electron transfer by charging the pre-lithiation cell with a constant voltage.

At this time, during the pre-lithiating of the negative electrode, the negative electrode may be charged with a constant voltage of 0.1 to −1 V (vs. Li/Li+), and more specifically be charged with a constant voltage of 0.1 to −0.5 V (vs. Li/Li+). When charging the negative electrode in the above range, the effect can be maximized. When the charging voltage is less than the range, it is difficult to achieve intended effects because the charging voltage is small, and when the charging voltage exceeds the range, unintended side reactions may occur.

Further, the pre-lithiating of the negative electrode may be performed by charging the pre-lithiation cell to reach 5 to 30% of a theoretical charge capacity, and specifically 10 to 25% of the theoretical charge capacity. When pre-lithiation is performed in the pre-lithiation cell by electrochemically charging in the above range, the reversible capacity of the battery can be improved as an SEI film can be uniformly and stably formed on the negative electrode, thereby improving cycle characteristics of the battery.

Further, when the pre-lithiation reaction of the negative electrode is completed by charging and discharging, the aging step can be further performed. Herein, the aging is a process of leaving the negative electrode unattended in the pre-lithiation solution for a predetermined time.

In this process, lithium ions inserted by pre-lithiation can be more uniformly diffused to the inside and the surface of the negative electrode active material. If the aging step is not performed after the pre-lithiation, the lithium ions may not be uniformly diffused in the negative electrode active material, thereby making it difficult to sufficiently remove the irreversible capacity, and there is a possibility that the uniform charge/discharge may not occur after preparation of the negative electrode. The aging time can be appropriately designed according to the pre-lithiation time.

Further, the method of pre-lithiating a negative electrode according to the present invention further includes washing and drying the negative electrode. At this time, the negative electrode may have been aged after pre-lithiation.

As such, impurities remaining in the negative electrode may be removed. The washing step can be performed in a separately prepared washing tank, and the pre-lithiated and aged negative electrode can be immersed in the washing tank containing an organic solvent to perform the washing step. The organic solvent does not contain lithium salt, and the same one as the organic solvent used for the above-described pre-lithiation solution may be used. Specifically, at least one selected from the group consisting of dimethyl carbonate (DMC), ethyl methyl carbonate (EMC), and ethylene carbonate (EC) may be used as the organic solvent. The length of the washing tank may be appropriately designed according to the number of the negative electrodes injected into the pre-lithiation reactor, the pre-lithiation time, and the size of the pre-lithiation reactor.

Further, the drying step can be performed by taking the washed electrode out from the washing tank and inserting the electrode into the drying unit. The drying step may be performed by air or inert gas. Specifically, the inert gas may be at least one selected from the group consisting of Ar, $N_2$ and He.

In the drying step, the drying temperature of the negative electrode may be in the range of 10 to 80° C., specifically 20 to 60° C., and more specifically 25 to 50° C. In this range, the oxidation of the negative electrode can be prevented, and the pre-lithiated state of the negative electrode can be maintained. The drying time may also be appropriately designed depending on the pre-lithiation time, the aging time, and the washing time.

The negative electrode, which has been washed and dried, may be collected and used to prepare a secondary battery.

Likewise, an SEI film is formed on a surface of the pre-lithiated negative electrode. The SEI film has characteristics capable of blocking electron transfer with the outside for the negative electrode and contains a large amount of LiF and $Li_2CO_3$. Specifically, a content of LIF contained in the SEI film may be in a range of 10 to 20% by weight, and a content of $Li_2CO_3$ contained in the SEI film may be in a range of 20 to 40% by weight. Specifically, a content of LIF contained in the SEI film may be in a range of 12 to 18% by weight, and a content of $Li_2CO_3$ contained in the SEI film may be in a range of 25 to 35% by weight. The intended electron transfer blocking effect can be achieved when the content of LiF and $Li_2CO_3$ is in the above range.

<Secondary Battery>

Further, the present invention provides a method for manufacturing a secondary battery including the above-described method of pre-lithiating a negative electrode.

The secondary battery has a form where an electrode assembly, which has a form that a separator is interposed between a positive electrode and a negative electrode, is accommodated in a battery case. The positive electrode has a structure that a positive electrode active material layer is formed as a positive electrode slurry containing a positive electrode active material is applied on a positive electrode current collector, and the negative electrode is as described above.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Further, the positive electrode slurry further contains a conductive material and a binder as well as a positive electrode active material, which is as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Further, the battery case is not particularly limited as long as it is used as an exterior material for packaging the battery, and a cylindrical, square, or pouch type may be used and specifically a pouch-type battery case may be used. The pouch-type battery case is generally made of an aluminum laminate sheet and may be composed of an inner sealant layer for sealing, a metal layer for preventing permeation of materials, and an external resin layer forming the outermost part of the case. Details of the battery case are known to those of ordinary skill in the art, and thus detailed description thereof will be omitted.

When an electrode assembly is accommodated in a battery case, the electrolyte solution is injected and sealed. Thereafter, a final secondary battery is manufactured through the formation process. Details about the electrolyte solution are known to those of ordinary skill in the art, and thus detailed description thereof will be omitted.

<Negative Electrode>

The present invention also provides a pre-lithiated negative electrode according to the pre-lithiation method of the negative electrode as described above.

The negative electrode according to the present invention has a structure where an SEI film is formed on the surface of the negative electrode. The SEI film has characteristics capable of blocking electron transfer with the outside for the negative electrode and contains a large amount of LiF and $Li_2CO_3$. Specifically, a content of LIF contained in the SEI film may be in a range of 10 to 20% by weight, and a content of $Li_2CO_3$ contained in the SEI film may be in a range of 20 to 40% by weight. Specifically, a content of LIF contained in the SEI film may be in a range of 12 to 18% by weight, and a content of $Li_2CO_3$ contained in the SEI film may be in a range of 25 to 35% by weight. The intended electron transfer blocking effect can be achieved when the content of LiF and $Li_2CO_3$ is in the above range.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Pre-Lithiation Solution>

The pre-lithiation solution was manufactured by adding $LiPF_6$ of 1M concentration as a lithium salt to an organic solvent, which is obtained by mixing ethylene carbonate (EC), fluoroethylene carbonate (FEC) and ethyl methyl carbonate (EMC) at the volume ratio of 1:2:7, and then mixing them for 24 hours.

<Preparation of Negative Electrode>

85 wt % of graphite and 9.5 wt % of SiO as the negative electrode active material, 1.4 wt % of Denka black as the conductive material, 3.0 wt % of SBR as the binder, and 1.1 wt % of CMC as the thickener were added to water to thereby prepare a negative electrode slurry.

The negative electrode slurry was coated on both surfaces of the copper current collector (thickness: 8 μm), which was then rolled and dried at a vacuum oven of 120° C. and rolled, to thereby form a negative electrode active material layer on the copper negative electrode current collector to thereby manufacture a negative electrode.

<Preparation of Coin-Type Half Cell>

A coin-type half cell was manufactured using the above-prepared electrolyte solution and negative electrode. Specifically, a coin-type half cell was prepared by interposing a separator between a negative electrode and a lithium metal counter electrode, and the above-described pre-lithiation solution was injected into the coin-type half cell.

<Pre-Lithiation>

Pre-lithiation was performed by electrochemically charging the coin-type half cell. Specifically, the half cell was changed to a capacity corresponding to 10% of the total theoretical charge capacity while performing charge by applying a constant voltage of −0.2 V to the half cell. If pre-lithiation was completed, the negative electrode was separated from the half cell, and the negative electrode was then washed and dried. At this time, aging can be performed before separating the negative electrode from the half cell.

Example 2

The negative electrode was pre-lithiated in the same manner as in the example 1 except that a pre-lithiation solution, which was prepared by adding $LiPF_6$ of 1 M concentration as a lithium salt to an organic solvent which was generated by mixing ethylene carbonate (EC) fluoroethylene carbonate (FEC) and ethyl methyl carbonate (EMC) at the volume ratio of 2:1:7, was used.

Example 3

The negative electrode was pre-lithiated in the same manner as in the example 1 except that a pre-lithiation solution, which was prepared by adding $LiPF_6$ of 1 M concentration as a lithium salt to an organic solvent which was generated by mixing ethylene carbonate (EC) fluoroethylene carbonate (FEC) and ethyl methyl carbonate (EMC) at the volume ratio of 2.5:0.5:7, was used.

Comparative Example 1

The negative electrode was pre-lithiated in the same manner as in the example 2 except that the coin-type half cell was charged with a constant current of 1.32 A during the pre-lithiation process.

Comparative Example 2

The negative electrode was pre-lithiated in the same manner as in the comparative example 1 (constant current charge) except that $LiPF_6$ of 1M concentration as the lithium salt was added to an organic solvent, which was generated by mixing ethylene carbonate (EC) and ethyl methyl carbonate (EMC) at the volume ratio of 3:7, and vinylene carbonate (VC) of 1.5 wt. % and fluoroethylene carbonate (FEC) of 2.0 wt. % were added as additives, based on the total weight of the organic solvent.

Comparative Example 3

85 wt % of graphite and 9.5 wt % of SiO as the negative electrode active material, 1.4 wt % of Denka black as the conductive material, 3.0 wt % of SBR as the binder, and 1.1 wt % of CMC as the thickener were added to water to thereby prepare a negative electrode slurry.

The negative electrode slurry was coated on both surfaces of the copper current collector (thickness: 8 μm), which was then rolled and dried at a vacuum oven of 120° C. and rolled, to thereby form a negative electrode active material layer on the copper negative electrode current collector to thereby manufacture a negative electrode. The pre-lithiation process was not performed for the negative electrode.

Experimental Example

<Coulomb Efficiency Test>

A coin-type half cell was prepared by injecting an electrolyte solution after interposing a polyolefin separator between the lithium metal counter electrode and the negative electrode. 1M $LiPF_6$ as a lithium salt was dissolved in an organic solvent, which was generated by mixing ethylene carbonate (EC) and ethyl methyl carbonate (EMC) at the volume ratio of 3:7, and vinylene carbonate (VC) and fluoroethylene carbonate (FEC) were added as additives, to thereby obtain an electrolyte solution.

The coin-type half cell was stored for a predetermined period and was then charged using an electrochemical charge-discharge device, to thereby measure the coulomb efficiency. Specifically, the half cell was charged up to 5V (vs Li/Li+) at the current density of 0.1 C and was discharged up to 1.5V (vs Li/Li+) at the same current density. This was repeated 3 cycles, and the charge capacity and the discharge capacity of the battery cell were measured at the third cycle. Thereafter, the initial efficiency was measured using the ratio of the charge capacity to the discharge capacity as in the Formula 1, and the result was shown in Table 1. In Table 1, the initial coulomb efficiency means coulomb efficiency which was measured by charging and discharging a half cell without a storage period.

Coulomb efficiency (%)={(discharge capacity)/(charge capacity)}×100 [Formula 1]

<Cycle Characteristics Test>

A positive electrode and a negative electrode prepared in the examples and the comparative examples were prepared, and a polyolefin separator was interposed between the positive electrode and the negative electrode, into which an electrolyte solution was injected, to thereby prepare a battery cell. Herein, the positive electrode was manufactured by applying a positive electrode slurry, which contains $LiCoO_2$ as a positive electrode active material, on a positive electrode current collector made of aluminum. Further, 1M $LiPF_6$ as a lithium salt was dissolved in an organic solvent, which was generated by mixing ethylene carbonate (EC) and ethyl methyl carbonate (EMC) at the volume ratio of 3:7, and vinylene carbonate (VC) and fluoroethylene carbonate (FEC) were added as additives, to thereby obtain an electrolyte solution.

After charging and discharging the coin-type battery cell 100 times, the capacity retention rate was evaluated according to the following formula 2.

Capacity retention rate (%)={(discharge capacity in 100-th cycle)/(discharge capacity in the first cycle)}×100 [Formula 2]

Specifically, the battery cell was charged with 4.2V (vs Li/Li+) at the current density of 0.1 C and was discharged with 2.5V (vs Li/Li+) at the same current density up to the third cycle. From the 4th cycle, the charge/discharge was performed with the current density of 0.5 C under the same voltage condition.

<Evaluation of Elements on the Surface of Negative Electrode>

The pre-lithiated electrode was washed in DMC for 1 minute or less, and X-ray photoelectron spectroscopy (XPS) experiment was performed. In the experiment, the content value of the LiF component was obtained through peak intensity in 685.2 eV at F 1 s. The content of $Li_2CO_3$ component was obtained through the peak intensity in 531.7 eV which was a region where the peak of $CO_3$ was shown at O 1 s. The content value of a specific component in the SEI was obtained through the percentage of the peak intensity of the component in the peak intensity of all elements.

TABLE 1

|  | Initial coulomb efficiency (%) | Coulomb efficiency after 1 day storage (%) | Coulomb efficiency after 2 week storage (%) | Capacity retention rate after 100 cycles (%) | LiF/ $Li_2CO_3$ Element ratio (%) |
| --- | --- | --- | --- | --- | --- |
| Example 1 | 97.61 | 96.54 | 96.6 | 97.1 | 11/27 |
| Example 2 | 97.92 | 97.72 | 97.1 | 98.9 | 15/32 |
| Example 3 | 97.84 | 96.91 | 96.7 | 97.5 | 10/22 |
| Comparative Example 1 | 96.5 | 95.8 | 93.4 | 95.4 | 7/16 |
| Comparative Example 2 | 96.145 | 95.245 | 90.239 | 92.1 | 9.4/13 |
| Comparative Example 3 | 86.173 | — | — | 87.2 | 6/16.5 |

Referring to Table 1, in the case of the examples 1 to 3 where a pre-lithiation solution containing FEC was used, and a constant voltage charge was performed at the time of pre-lithiation, the coulomb efficiency and the capacity retention rate were more excellent than those of the comparative examples 1 and 2. In particular, in the examples 1 to 3, the coulomb efficiency was maintained even after a long time storage of the negative electrode, which indicates that a film having an excellent oxidation resistance was formed on the surface by adding FEC and performing charge with a constant voltage. This can be understood from the point that the content of LiF and $Li_2CO_3$ on the surface of the pre-lithiated electrode measured in examples 1 to 3 is greater than that in the comparative example. Namely, in the case of the examples 1 to 3, lithium and electrons, which were inserted through pre-lithiation, were not consumed during a long time storage as the oxidation resistance increased, and accordingly, the capacity retention rate was higher than that of the comparative example.

Particularly, in the case of the comparative example 2, the coulomb efficiency and capacity retention rate were lower than that of the comparative example 1 in which a pre-lithiation solution, to which FFC was added, was used, and the amount of reduction of the coulomb efficiency was greater than that of the comparative example 1. This indicates that when FEC is used in an additive level, a film having oxidation resistance enough to block redox reaction on the surface of the negative electrode (film containing a large amount of LiF and $Li_2CO_3$) is not formed.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

The invention claimed is:

1. A method of pre-lithiating a negative electrode, the method comprising:
    preparing a negative electrode by forming a negative electrode active material layer comprising a negative electrode active material on a negative electrode current collector;
    preparing a pre-lithiation cell comprising the negative electrode and a lithium metal counter electrode;
    impregnating the pre-lithiation cell in a pre-lithiation solution; and
    pre-lithiating the negative electrode by charging the pre-lithiation cell with a constant voltage to form a pre-lithiated negative electrode,
    wherein the pre-lithiation solution comprises 3 volume % to 30 volume % of an organic carbonate compound substituted with halogen, and
    wherein during the pre-lithiating of the negative electrode, the negative electrode is charged with a constant voltage of -0.2 V to -1 V.

2. The method of claim 1, wherein the negative electrode active material comprises a carbon-based active material and a silicon-based active material.

3. The method of claim 1, wherein the organic carbonate compound substituted with halogen is a cyclic carbonate expressed by Chemical Formula 1 below:

[Chemical formula 1]

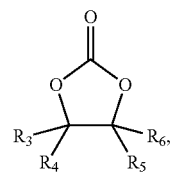

wherein $R_3$, $R_4$, $R_5$, and $R_6$ are each independently a hydrogen, a halogen, or a substituted or unsubstituted alkyl group having 1 to 10 carbon atoms, and
wherein at least one of $R_3$, $R_4$, $R_5$, and $R_6$ is halogen, or is the substituted alkyl group, wherein the substituted alkyl group is substituted with halogen.

4. The method of claim 1, wherein the organic carbonate compound substituted with halogen is a fluoroethylene carbonate.

5. The method of claim 1, wherein the pre-lithiation solution comprises 5 volume % to 20 volume % of the organic carbonate compound substituted with halogen.

6. The method of claim 1, wherein the pre-lithiating of the negative electrode is performed by charging the pre-lithiation cell to reach 5% to 30% of a theoretical charge capacity.

7. The method of claim 1, further comprising: aging the pre-lithiated negative electrode to form an aged negative electrode.

8. The method of claim 7, further comprising: washing and drying the aged negative electrode.

9. The method of claim 1, wherein a solid electrolyte interface (SEI) film is formed on a surface of the pre-lithiated negative electrode.

10. The method of claim 9, wherein the SEI film comprises LiF and $Li_2CO_3$.

11. The method of claim 10, wherein an amount of LiF present in the SEI film is in a range of 10% to 20% by weight, and an amount of $Li_2CO_3$ present in the SEI film is in a range of 20% to 40% by weight.

12. A method for manufacturing a secondary battery comprising the method of pre-lithiating a negative electrode according to claim 1.

13. A pre-lithiated negative electrode which is pre-lithiated according to the method of pre-lithiating the negative electrode according to claim 1,
   wherein a solid electrolyte interface (SEI) film is on a surface of the negative electrode, and
   wherein an amount of LiF present in the SEI film is in a range of 10% to 20% by weight, and an amount of $Li_2CO_3$ present in the SEI film is in a range of 20% to 40% by weight.

14. A method of pre-lithiating a negative electrode, the method comprising:
   preparing a negative electrode by forming a negative electrode active material layer comprising a negative electrode active material on a negative electrode current collector;
   preparing a pre-lithiation cell comprising the negative electrode and a lithium metal counter electrode;
   impregnating the pre-lithiation cell in a pre-lithiation solution; and
   pre-lithiating the negative electrode by charging the pre-lithiation cell with a constant voltage to form a pre-lithiated negative electrode,
   wherein the pre-lithiation solution comprises 3 volume % to 30 volume % of an organic carbonate compound substituted with halogen,
   wherein during the pre-lithiating of the negative electrode, the negative electrode is charged with a constant voltage of −0.2 V to −1 V, and
   wherein the pre-lithiating of the negative electrode is performed by charging the pre-lithiation cell to reach 5% to 30% of a theoretical charge capacity.

15. The method of claim 1, wherein the pre-lithiating of the negative electrode is performed by charging the pre-lithiation cell to reach 5% to 10% of a theoretical charge" capacity.

* * * * *